(12) United States Patent
Bestgen et al.

(10) Patent No.: US 6,915,290 B2
(45) Date of Patent: Jul. 5, 2005

(54) DATABASE QUERY OPTIMIZATION APPARATUS AND METHOD THAT REPRESENTS QUERIES AS GRAPHS

(75) Inventors: Robert Joseph Bestgen, Dodge Center, MN (US); Curtis Boger, Oronoco, MN (US); John David Dietel, Rochester, MN (US); Robert Victor Downer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 10/014,996

(22) Filed: Dec. 11, 2001

(65) Prior Publication Data

US 2003/0120682 A1 Jun. 26, 2003

(51) Int. Cl.[7] .............................................. G06F 17/30
(52) U.S. Cl. ........................................ 707/2; 707/100
(58) Field of Search ................................. 707/2, 3, 100

(56) References Cited

U.S. PATENT DOCUMENTS

| | | | | |
|---|---|---|---|---|
| 5,659,725 A | * | 8/1997 | Levy et al. .................... 707/3 |
| 5,694,591 A | * | 12/1997 | Du et al. ....................... 707/2 |
| 5,999,192 A | * | 12/1999 | Selfridge et al. ........... 345/440 |
| 6,021,405 A | * | 2/2000 | Celis et al. .................... 707/2 |
| 6,088,524 A | * | 7/2000 | Levy et al. .................... 707/3 |
| 6,122,644 A | * | 9/2000 | Graefe et al. ............... 707/202 |
| 6,138,111 A | * | 10/2000 | Krishna ......................... 707/2 |

\* cited by examiner

*Primary Examiner*—Greta Robinson
*Assistant Examiner*—Cheryl Lewis
(74) *Attorney, Agent, or Firm*—Martin & Associates, LLC; Derek P. Martin

(57) ABSTRACT

A database query optimizer constructs a graph comprising nodes, relations, and expressions. The query optimizer then constructs execution plans for sub-parts of the graph. The combination of execution plans make up the overall execution plan for the query. The execution plan information is appended to the graph itself, allowing changing an execution plan in one portion of the graph without necessarily changing execution plans in other portions of the graph. By representing a query using the graph of the preferred embodiments that includes execution plan information, the query optimizer is able to evaluate the execution plans of different options quickly and efficiently, thereby enhancing the performance of the query optimizer.

20 Claims, 20 Drawing Sheets

SELECT * FROM Table1 WHERE
C1=4 AND (C2>6 OR C3!=8)

C1=4 AND (C2>6 OR C3!=8)

SELECT a.f1 FROM a
UNION ALL
SELECT b.f1 FROM b
UNION ALL
SELECT c.f1 FROM c

WITH a AS (SELECT f1 FROM b)
SELECT a.f1 FROM a
GROUP BY a.f1
ORDER BY a.f1

... WHERE FileA.Col1=FileA.Col2

... WHERE FileA.Col1=FileA.Col2 AND FileA.Col1=7

SELECT SUBSTR(FileA.Col1,1,4) . . .

. . . WHERE FileA.Col1 = FileB.Col1 . . .

WITH A AS (SELECT C.Fld1 FROM FileA C)
SELECT FileB.Fld1 FROM FileB.A
WHERE A.Fld1= FileB.Fld2

SELECT Fld1 FROM FileA
WHERE Fld1=7 AND
FileA.Fld3=(SELECT FileB.Fld3 FROM FileB WHERE Fld3=42)

DATABASE QUERY OPTIMIZATION APPARATUS AND METHOD THAT REPRESENTS QUERIES AS GRAPHS

BACKGROUND OF THE INVENTION

1. Technical Field

This invention generally relates to computer systems, and more specifically relates to apparatus and methods for accessing data in a computer database.

2. Background Art

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from tables in a database is typically done using queries. A database query typically includes one or more expressions interconnected with operators. A query usually specifies conditions that apply to one or more columns of the tables, and may specify relatively complex logical operations on multiple columns. The database is searched for records that satisfy the query, and those records are returned as the query result.

One problem with known database systems is the evaluation of complex expressions that may be present in a query. Known query optimizers attempt to choose the most efficient way to execute each query request, and output an "execution plan", "access plan", or just "plan". The execution plan contains low-level information in a proprietary form unique to the optimizer that tells the system precisely what steps to take, and in what order, to execute the query. Associated with each plan is the optimizer's estimate of how long it will take to run the query using the plan. A block diagram of a known system 100 that uses a query optimizer is shown in FIG. 1. A user generates a query 110. For the example in FIG. 1, we assume the query 110 is written in Structured Query Language (SQL). The query is parsed into its component parts by a parser 120, resulting in a parsed statement 130. The query optimizer 140 then evaluates the parsed statement 130 and generates an execution plan 150. Note that query optimizer 140 receives statistics from the file system 170 that help the query optimizer 140 to determine how to construct the execution plan 150. Once completed, the execution plan 150 is submitted to the database engine 160, which processes the query by accessing the database stored in the file system 170.

The optimizer's job is necessary and difficult because of the enormous number of possible query forms that can result from using SQL with any number of relational tables made up of countless data columns of various types, combined with a theoretically infinite number of methods of accessing the actual data records from each table referenced (e.g., using an index, a hash table, etc.), plus the combinations of those methods of access among all the tables referenced. Since the optimizer is free to rewrite a query (or a portion of it) into any functionally-equivalent form, and for any given query there are usually many functionally-equivalent forms, the optimizer has a countably infinite universe of extremely diverse possible execution plans to consider, but limited time in which to evaluate those plans.

One way to view a query optimizer is that of a query execution simulator, since in order to do a cost estimate of the execution plan for the query, the optimizer must simulate the environmental conditions under which the query will eventually be executed. Known methods for simulating a query do not allow for easily generating alternative plans and discarding them in favor of better plans.

Without an apparatus and method for more efficiently processing a query, the computer industry will continue to suffer from excessive overhead in processing database queries.

DISCLOSURE OF INVENTION

According to the preferred embodiments, a database query optimizer constructs a graph comprising nodes, relations, and expressions. The query optimizer then constructs execution plans for sub-parts of the graph. The combination of execution plans make up the overall execution plan for the query. The execution plan information is appended to the graph itself, allowing changing an execution plan in one portion of the graph without necessarily changing execution plans in other portions of the graph. By representing a query using the graph of the preferred embodiments that includes execution plan information, the query optimizer is able to evaluate the execution plans of different options quickly and efficiently, thereby enhancing the performance of the query optimizer.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

The present invention relates to optimizing database queries. For those not familiar with databases or queries, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions and one or more value expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

Figures 1, 2, 3:
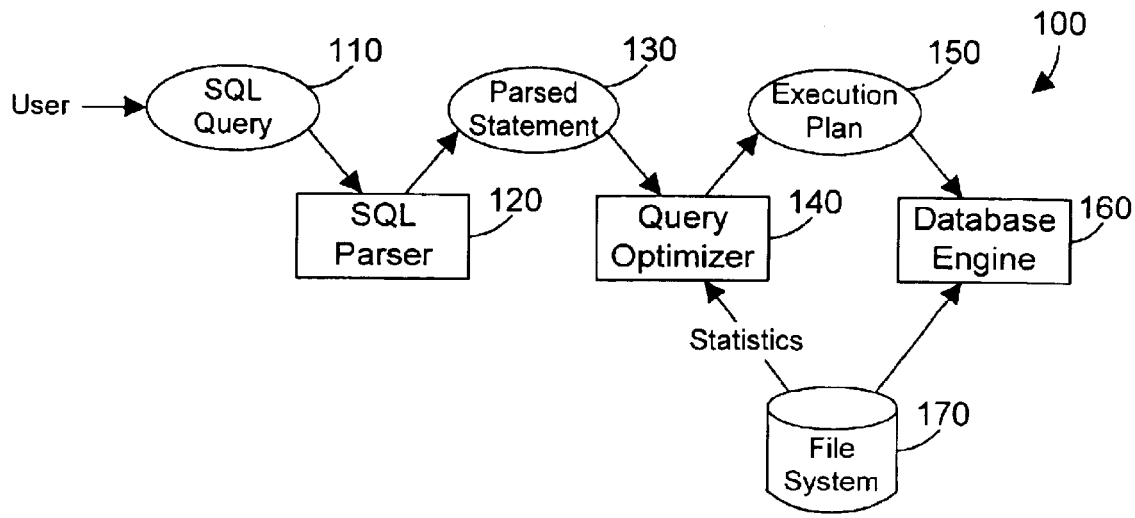
FIG. 1 is a block diagram of a prior art system for processing a database query.
FIG. 2 is a sample database query in Structured Query Language (SQL)
FIG. 3 is an expression that is representative of the "where" clause in the sample database query of FIG. 2.

One popular way to define a query uses Structured Query Language (SQL). SQL defines a syntax for generating and processing queries that is independent of the actual structure and format of the database. One sample SQL query is shown in FIG. 2. The "SELECT *" statement tells the database query processor to select all columns, the "FROM Table1" statement identifies which database table to search, and the "WHERE" clause specifies one or more expressions that must be satisfied for a record to be retrieved. Note that the query of FIG. 2 is expressed in terms of columns C1, C2 and C3. Information about the internal storage of the data is not required as long as the query is written in terms of expressions that relate to values in columns from tables.

For the query of FIG. 2, the WHERE clause specifies that the first column has a value equal to four (C1=4) logically ANDed with the expression that the second column is greater than six OR the third column is not equal to eight. The expression in the WHERE clause of FIG. 2 is shown in FIG. 3.

In the prior art, a tool known as a query optimizer evaluates expressions in a query. There are two different aspects of a query that an optimizer must consider: query function, and query performance. The function of a query is defined by the language used to formulate the query. As stated above, SQL is one suitable database query language. The function of a query must remain constant. However, given the functional requirements of a query, the query optimizer has the freedom to choose the runtime methods to be used to achieve the functional requirements, which determines query performance. For example, if the query has an ORDER BY clause, the optimizer may choose to use an index to access the data in an ordered fashion at runtime, or to have a sort done on the resulting records. At this point, the query optimizer needs to evaluate different ways of achieving the same functional result to determine which way results in the fastest processing of the query.

From a performance perspective, some query functions are more crucial than others. For example, join, ordering, grouping/aggregation, subquery/derived table/common table expressions are all functions that can greatly affect performance of the query because there are numerous functionally-equivalent ways of performing the query when these functions are present. The optimizer needs to evaluate different options for executing the query. Prior art query optimizers do this by generating a graph of the entire query, and by generating an execution plan that corresponds to the graph, and hence, to the entire query.

Figure 4:
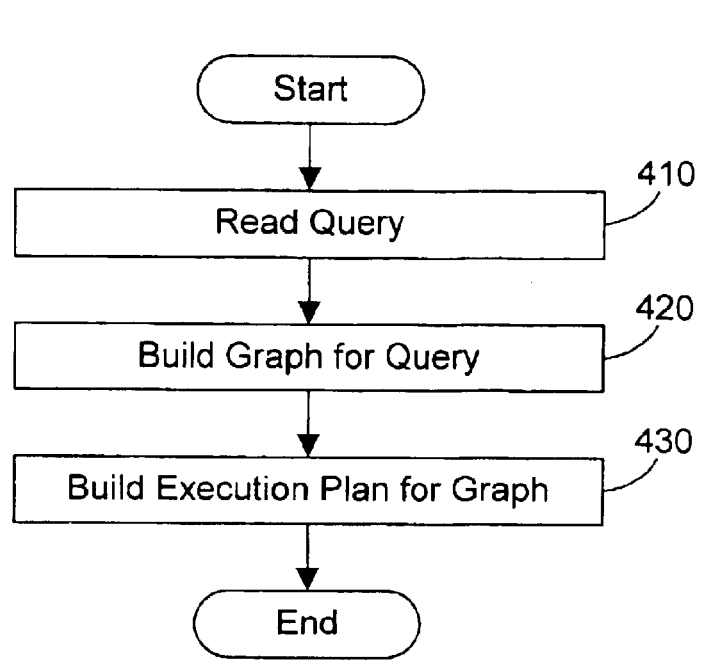
FIG. 4 is a flow diagram of a prior art method for building a graph and execution plan for an expression in a database query.
Figure 5:
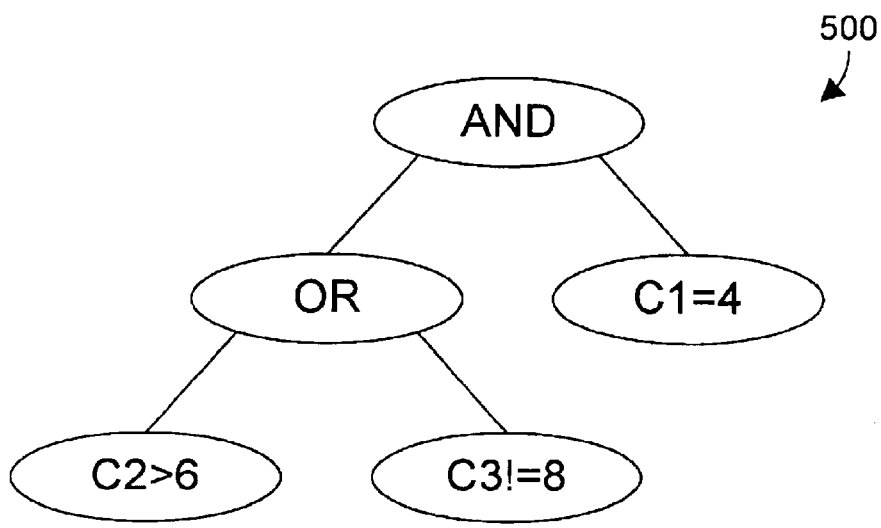
FIG. 5 is a tree graph for the expression of FIG. 3 that is constructed in step 420 of FIG. 4.

One known way to process a query is shown by method 400 of FIG. 4. First, the query is read (step 410). A graph for the query is built (step 420). For the where clause of FIG. 3, a prior art graph 500 of the query is shown in FIG. 5. Next, an execution plan corresponding to the graph is built (step 430). One type of graph that is known in the art for representing queries is a tree graph that is made up of points (often called vertices) and lines (often called edges) connecting some (possibly empty) subset of vertices. If the edges are directional, the graph is said to be "directed". If, when completely traversing the graph by following the edges no vertex is visited more than once, the graph is said to be acyclic.

One problem in the prior method for representing a query using a tree graph is that the vertices are typically created for each of the points in the query where tuples are provided to another portion of the query. These implementations represent all other aspects of the query (including functional and performance-related) as part of these vertices. Expressions representing comparisons and other data derivations and combinations are represented (perhaps in their own graph or simply as lists) as separate entities. Furthermore, in existing tree graphs, the execution plan for the entire tree is usually generated as a second tree that is separate from the main tree. Performance choices made by the optimizer are represented only in this separate plan tree.

Representing a database query using the tree graph of the prior art has several shortcomings. Since the expressions are separately represented in different tree graphs, subqueries and other SQL constructs such as common table expressions cause an unnatural break in the query tree, thus requiring special tree traversal code and additional optimizer complexity. Recognition of patterns in the tree (which is required for certain optimizations) requires extensive inquiry of the vertices, and the optimizer code that is specific to such optimizations must be aware of other things that these large vertices may represent. Since each plan is an entirely separate entity, representing all plans in the search space can consume a lot of space and take a long time to generate. And with each vertex containing possibly all of the crucial performance items listed above, it is difficult for an optimization technique to be added which deals with one such item (say, ordering) without being aware of all other aspects of that vertex. This prevents the notion of parallel optimization in some cases.

One of the problems with prior art method 400 arises from the need of building different execution plans so that alternative execution plans can be compared and contrasted to find an execution plan that has the best chance of executing in the least amount of time. With method 400, each time the execution plan is changed, even in a very minor way, step 430 must be repeated, resulting in a new and separate execution plan for the entire graph. This is very time-consuming, and results in performance penalties in processing queries. The preferred embodiments presented below provide a significant increase in performance by allowing an execution plan to be appended to nodes of the graph itself so that an execution plan for a portion of the graph does not necessarily change if the portion of the graph is unaffected by the change to the graph, thereby allowing a query optimizer in accordance with the preferred embodiments to more quickly process different execution plans for a query to determine which is most efficient.

2.0 Detailed Description

The preferred embodiments represent a query using a new type of graph referred to herein as a NRE graph, which stands for Nodes, Relations, and Expressions. Once the NRE graph is built, an execution plan may be generated and appended to the graph. The execution plan is split into execution plans that correspond to different portions of the graph. In this manner, a change to one portion of the graph may not require any changes to the execution plans for sub-parts of the graph that are unaffected by the change. This allows changes to the graph to be quickly evaluated by a query optimizer in an attempt to find an execution plan that results in the query being processed in the shortest time.

The solution of the present invention represents all entities that are required for the functional aspect of a query using a particular form of a directed acyclical graph. Each vertex in the graph represents one of the basic structural components of a query, which we refer to herein as graph elements. There are three subtypes of graph elements, namely: node, relation, and expression. The graph is referred to herein as an NRE graph, representative of these three subtypes, Nodes, Relations, and Expressions.

The definition of the node is in large part based on the separation of crucial performance items described above, thus allowing optimization techniques to be written which only need to be concerned with one of these (such as grouping optimization). Furthermore, the execution plan is generated for each portion of the graph that can be separately represented, and is appended to each corresponding node in the graph. This leaves the graph largely intact as new alternatives are generated, saving time and space. Execution plan information for portions of the graph that are unchanged by a modification to the graph do not have to be regenerated. as part of an overall execution plan for the query.

Another advantage of the NRE graph of the preferred embodiments is that there are no unnatural breaks in the graph, as there were in the tree graph of the prior art (such as for common table expressions and the like). Each portion of the query is represented in the complete graph as a set of separate vertices. This allows optimization techniques to be implemented without needing to be aware of how a particular portion of the graph came to be, making these techniques applicable to new SQL constructs without optimizer modification.

The graph for a query (or any component of that query which itself has the qualities and behavior of a query) has at its top point a node. A node represents what we call a MiniSelect, whose definition includes all the function of the SQL subselect plus all that of an SQL full select. By defining the node to include such a superset, we can represent all legal SQL constructs, and yet still support many as yet undetermined future SQL enhancements. In addition, by defining the node to include such a superset, the optimizer is free to rewrite parts of a query in semantically equivalent (and presumably faster-executing) forms, regardless of whether those new forms can actually be expressed in currently defined SQL statements.

A node in accordance with the preferred embodiments has the following important aspects: fanout type, a select list, predicate expressions, either a grouping/aggregation expression list or an ordered list of value expressions, and a tuple source in the form of a relation object or 1 or 2 child nodes. Note that a node can be referenced as a child of another node, as well as from SELECT relations (Common Table Expression, View).

Fanout type defines how input tuples to the node are to be used to determine its output, and includes: none, merge, intersect, inner join, left outer join, exception join, and right outer join. If the fanout type is none, the node has only one child, which produces no effect on the input stream. If the fanout type is merge, the input streams of the two children are merged without adding or losing tuples. For an intersect fanout type, only those tuples found in both children input streams are returned. For the inner join fanout type, one tuple is returned for every pairing of matching records between the table on the left and the one on the right (children). If the fanout type is left outer join, one tuple is returned for every pairing of matching records, plus one for each unmatched tuple from the first child. If the fanout type is exception join, each tuple from the first child that has no match in the second tuple is returned. If the fanout type is right outer join, each tuple from the second child that has no match in the first is returned. By defining the fanout types in this manner, all possible nodes that may be needed to represent an SQL query are present.

In addition to the fanout type, each node also includes a select list. A select list is an ordered list of value expressions, each of which describes one field in the tuple projected by this node to higher level nodes. Each node may also include one or more predicate expressions that are used to filter the result of a query. The filtering specified in a predicate expression is applied to the set of tuples before any aggregation is done. Since the node is defined to have only 0 or 1 such filtering expressions, if part of a query has more than one kind of filtering (say, WHERE and HAVING), additional nodes must be added to the graph, each with a single child. The final (top) node must in this case be the one with the HAVING predicate attached, and would in turn be the parent of the one with the WHERE filtering.

Each node will also have either a grouping/aggregation expression list (possibly empty), or a list of value expressions that specify the order in which tuples are returned. This list may be empty. The grouping/aggregation expression list is an ordered list of value expressions that determine how/if the values in the tuples returned are to be aggregated before they are returned. Tuples returned by the ordered list of value expressions are assumed to be sequenced according to the entries in this list.

The relation in a node represents a raw, unmanipulated (i.e., no filtering, aggregation or anything else) source of tuples. Its definition (but not its data) is viewed as read-only by its consumer, or the vertex that directs an edge to it. Thus, once defined in a graph, a relation is not modified by further transformations. A relation can range from a simple, 'atomic' item such as a physical table to a complex definition such as the resulting tuple set from a view or common table expression, or an index over another relation. Some relations point to nodes that describe the tuples that are returned by the relation (in terms of the select list, ordering and grouping, etc.), and are referred to as "select relations". A select relation is a tuple set from a "mini select" involving other relations, such as a view of common table expression. Note the recursive nature of the select relation.

In addition to the select relation, the preferred embodiments also define a correlation relation and a table relation. A correlation relation provides an indirection to represent some other relation, when that other relation appears in multiple different contexts within a single query (e.g., join of a file to itself). In other words, correlations exist whenever the semantics of the query require more than one distinct instance of that relation's tuple set. A table relation represents an actual table in the database.

SQL defines an expression as "something that provides a value". If an expression has no operators, the expression is the value. Otherwise, the value is the result of applying an operator to its operands which are themselves expressions, thus composing a subgraph of expression objects. SQL defines a "predicate" as a conditional operator applied to other expressions which, when evaluated, can be true or false. Predicates are a special kind of expression.

An expression can be any simple operand, or an operator and its operands. An operand may be arbitrarily complex— for example, it might come from the result of a subquery. The result data type of a value expression can be any data type supported by the database; the result type for a predicate expression is always Boolean.

Each expression in a particular context is uniquely represented. Predicate expressions are used to filter out tuples from the set returned by a portion of a query and are attached to nodes for this purpose. Value expressions are used in various relationships with other entities. The node uses a list of these to represent the values in each tuple that is returned by the miniselect that the node defines.

Any given expression in the graph can be referred to from many places. For example, the select list and the filter from a node may both contain a reference to a particular column. In this case the expression appears only once in the graph, with multiple edges referring to it. This means that any changes to the field are automatically reflected into all references to that field.

Value expressions are made up of operators, operands, and an attribute. The attribute gives the type, length, and other interesting aspects about a value. There are many different types of operators, including N-ary, conditional, aggregate, and select expression. An N-ary operator is a fundamental operation that takes from 0-n operands as arguments and returns a result value expression. Math functions and string operations are examples of N-ary operators. Conditional operators take three operands. Operand 1 is a predicate expression; if it evaluates true, the conditional expression result comes from the value expression given for operand 2. Otherwise it comes from the value expression that is given for operand 3. An aggregate operator is a value expression that works on entire sets of tuples, such as an average or sum function. A select expression represents a miniselect that is defined with a different node. The select expression takes a single operand, which is a node.

Four types of operands are currently defined in SQL for value expressions, namely: literal, reference variable, column, and another operator. A literal operand represents a literal field, i.e., a value expressed literally in the query. A reference variable operand represents a host variable or parameter marker, and contains the handle of a reference variable value, a list of which accompanies the query. A column operand represents a column from a relation object, whether the relation object represents a physical database table or not. A column operand contains a link to the "originator" relation object. Another operator may also be an operand if the definition of the expression is recursive.

Predicate expressions are also made up of operators and operands. The operator types are either relational or logical. A relational operator compares two operands that are value expressions, and returns a true if the two operands are equal, and returns a false if the two operands are not equal. A logical operator is a logical connective operator expression, the result of which is true or false. The operands for a logical expression are other predicate expressions.

Figures 6, 7:
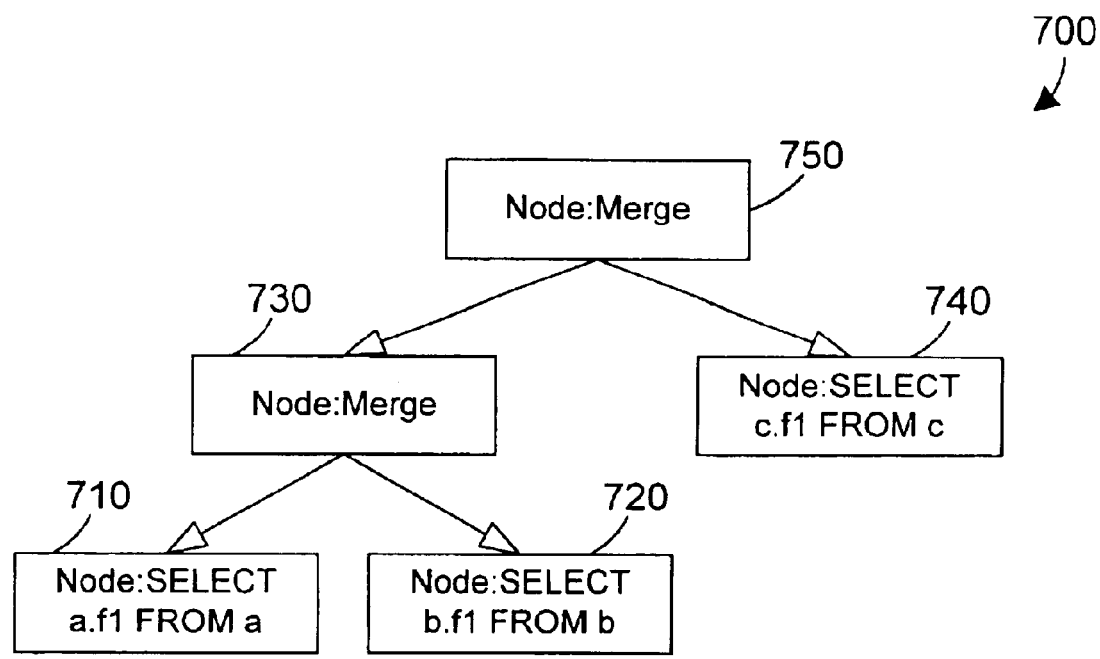
FIG. 6 is a sample query in SQL.
FIG. 7 is a graph of the query of FIG. 6 that is built by the query optimizer in accordance with the preferred embodiments.

Referring now to FIG. 6, a sample SQL query is shown. This query is represented in a graph 700 in FIG. 7 in accordance with the preferred embodiments. A node 710 represents the "SELECT a.f1 FROM a" statement in the query. A node 720 represents the "SELECT b.f1 FROM b" statement in the query. A merge node 730 has directed edges that point to the two nodes 710 and 720, which indicates the function of the UNION ALL operation between the two select statements represented in nodes 710 and 720. Another node 740 represents the "SELECT c.f1 FROM c" statement in the query. A merge node 750 has directed edges that point to the merge node 730 and the select node 740, representing the UNION ALL operation between these two nodes. The graph of FIG. 7 is thus a graphical representation in accordance with the preferred embodiments of the query in FIG. 6.

Figures 8, 9:
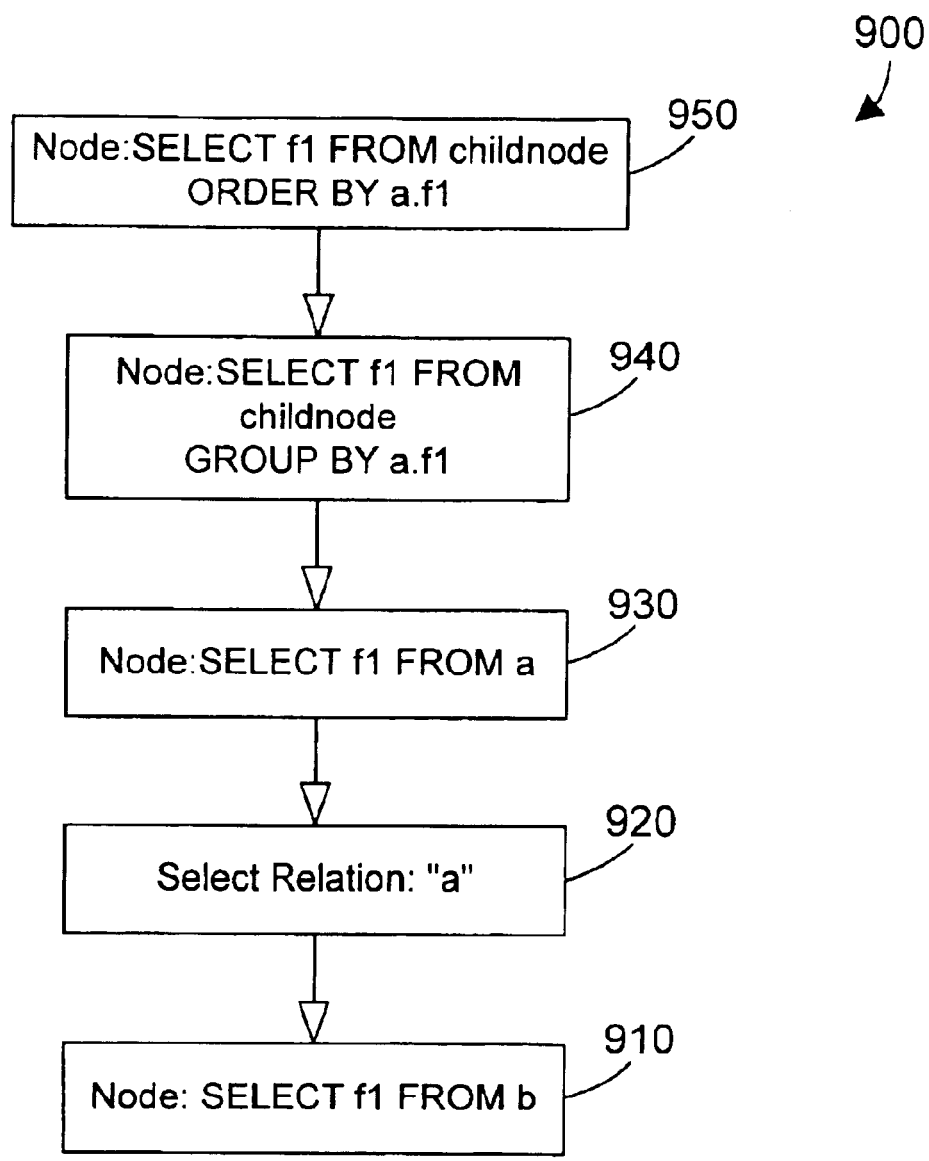
FIG. 8 is a sample query in SQL.
FIG. 9 is a graph of the query of FIG. 8 that is built by the query optimizer in accordance with the preferred embodiments.

Referring now to FIG. 8, another sample SQL query is shown. This query is represented in a graph 900 in FIG. 9 in accordance with the preferred embodiments. The bottom node in the graph is node 910, which represents the "SELECT f1 FROM b" statement in the first line of the query. A selection relation 920 points to node 910, and defines the relation that variable "a" represents the select statement in node 910. Next, node 930 points to 920. Node 930 represents the "SELECT f1 FROM a" statement in the query. A node 940 points to the node 930. Node 940 represents the GROUP BY statement in the query. Finally, a node 950 points to node 940. Node 950 represents the "ORDER BY a.f1" statement in the query. The complete graph 900 in FIG. 9 thus represents in a graphical form the information in the query of FIG. 8.

Figures 10, 11:
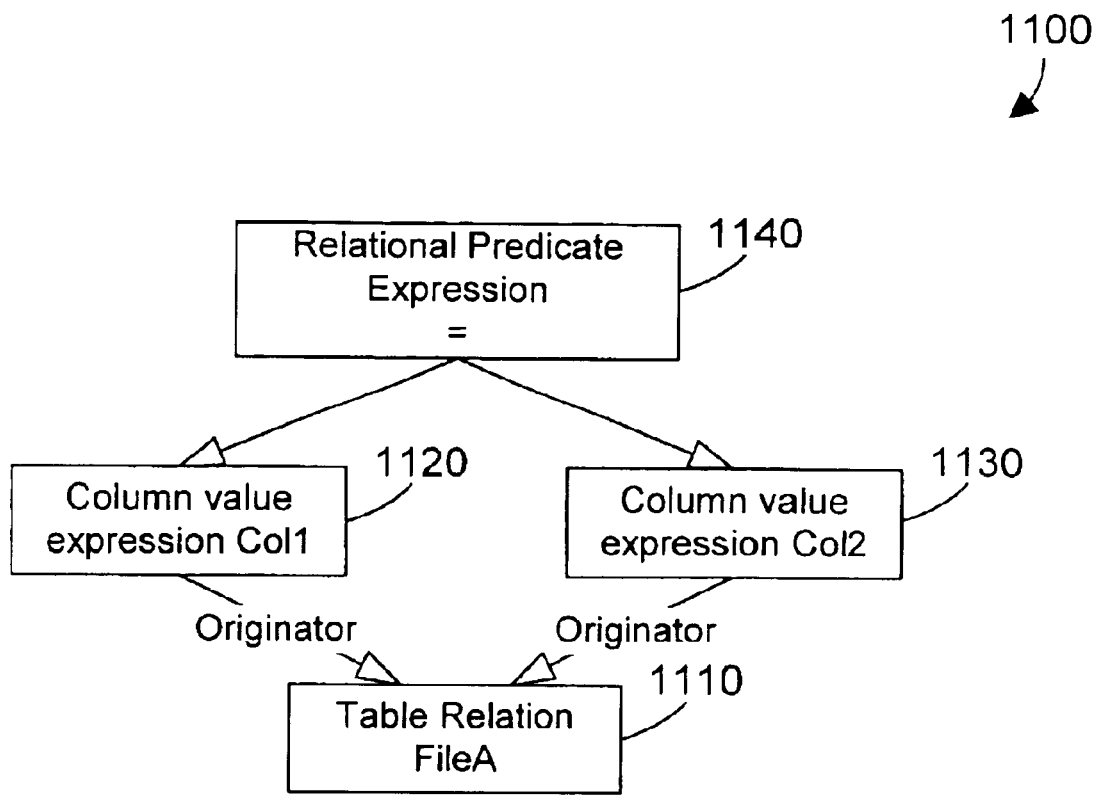
FIG. 10 is a "where" clause of a sample query in SQL.
FIG. 11 is a graph of the where clause of FIG. 10 that is built by the query optimizer in accordance with the preferred embodiments.

Referring now to FIG. 10, a WHERE clause of a sample SQL query is shown. This WHERE clause is represented in graph 1100 of FIG. 11 in accordance with the preferred embodiments. The bottom vertex in the graph 1110 represents the FileA table. Vertex 1120 represents the common value expression Col1, while vertex 1130 represents the common value expression Col2. Both 1120 and 1130 have directed edges that point to 1110 representative of the FileA table. A relational predicate expression 1140 has edges that point to the column value expression 1120 and 1130, indicating the condition that these two column value expressions are equal. The example in FIGS. 10 and 11 illustrates that a graph can be built not only for a query, but for sub-portions of a query as well. If an SQL query included the WHERE clause in FIG. 10, the graph for the overall query would include the graph for the WHERE clause shown in FIG. 11 as a sub-portion of the graph.

Figures 12, 13:
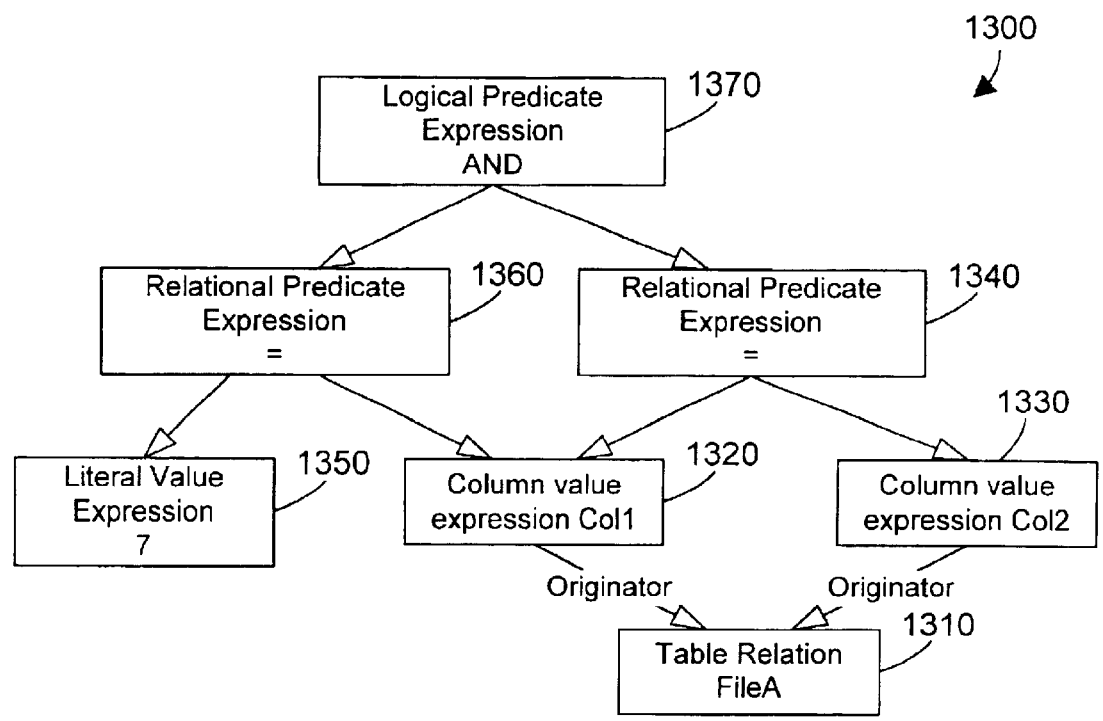
FIG. 12 is a "where" clause of a sample query in SQL.
FIG. 13 is a graph of the where clause of FIG. 12 that is built by the query optimizer in accordance with the preferred embodiments.

Referring now to FIG. 12, a "where" clause of another sample SQL query is shown. This query is represented in graph 1300 of FIG. 13 in accordance with the preferred embodiments. Note that the query in FIG. 12 contains the "FileA.Col1=FileA.Col2" statement, which is the same as the query in FIG. 10, but also includes an additional statement that logically ANDs this statement with FileA.Col1=7. In examining the graph of FIG. 13, we see that 1310, 1320, 1330 and 1340 are representative of the "FileA.Col1= FoleA.Col2" statement, which is why these are identical to 1110, 1120, 1130 and 1140, respectively, shown in FIG. 11. A vertex 1350 contains a literal value expression (the number 7), while 1360 contains the relational predicate expression "=". Note that 1360 points to 1350 and 1320, which means that 1360 is representative of the "FileA.Col1= 7" statement in the query. Finally, 1370 includes edges that point to 1360 and 1340, effectively ANDing these two together.

Figures 14, 15:
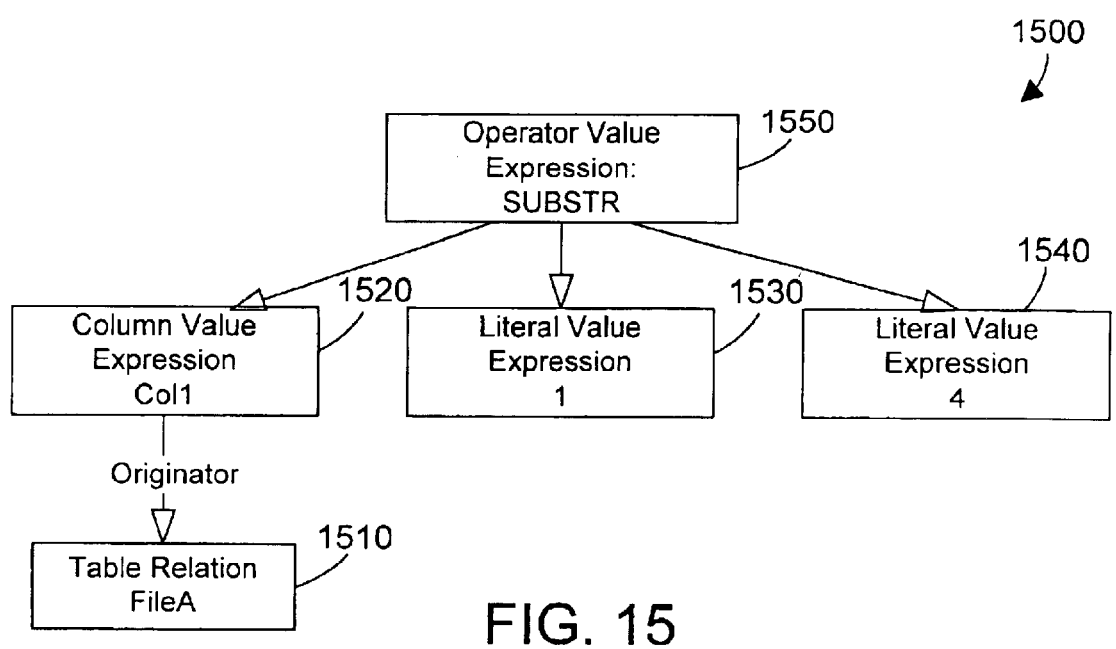
FIG. 14 is a "select" clause of a sample query in SQL.
FIG. 15 is a graph of the select clause of FIG. 14 that is built by the query optimizer in accordance with the preferred embodiments.

Another sample SQL query is shown in FIG. 14. This query is a SELECT statement that specifies a SUBSTR operator that receives three parameters, namely FileA.col1, the number 1, and the number 4. SUBSTR is a "substring" operator that returns a character string extracted from its first operand, starting at a relative position given in the second operand, for a length given by the third operand. Thus, for the example in FIG. 14, the SUBSTR operator takes the character string in column 1 of FileA starting at the first character for a length of four characters. The NRE graph 1500 for the query of FIG. 14 in accordance with the preferred embodiments is shown in FIG. 15. 1510 represents the table in FileA. A column expression for Col1 1520 points to FileA 1510. 1530 and 1540 represent the two literal values (1 and 4) that are parameters to the SUBSTR operator. The SUBSTR operator is represented in 1550, which includes edges that point to the three parameters 1520, 1530 and 1540.

Figures 16, 17:
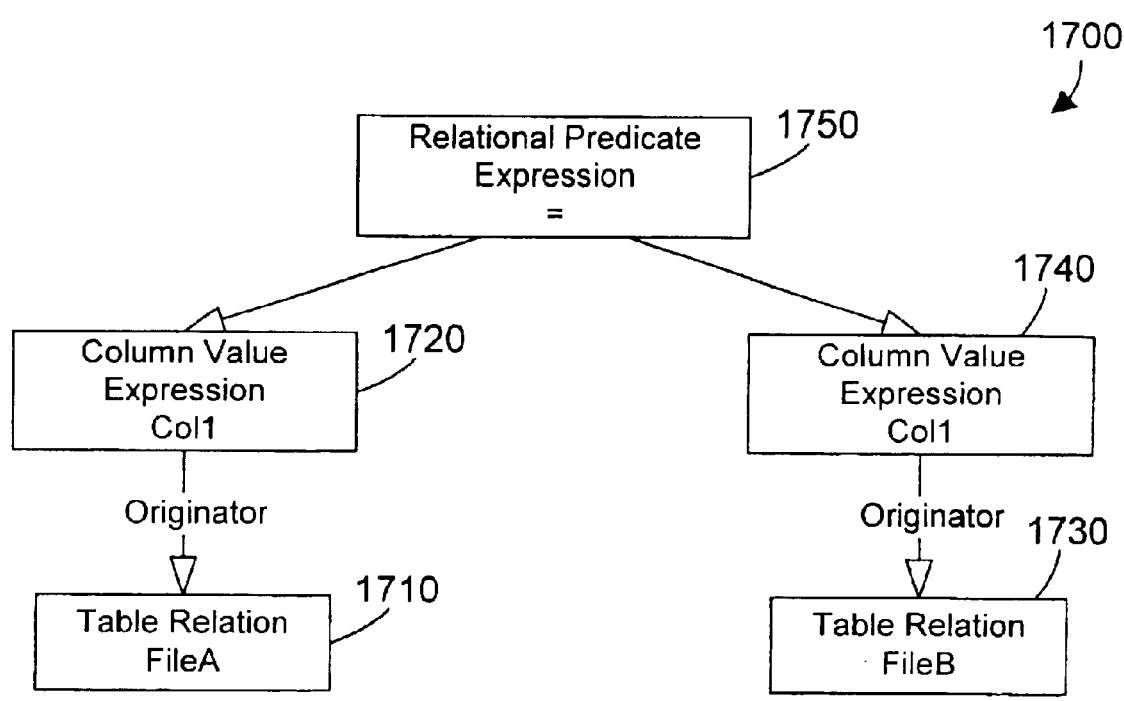
FIG. 16 is a "where" clause of a sample query in SQL.
FIG. 17 is a graph of the where clause of FIG. 16 that is built by the query optimizer in accordance with the preferred embodiments.

Referring now to FIG. 16, a "where" clause of another sample SQL query is shown. This query is represented in graph 1700 of FIG. 17 in accordance with the preferred embodiments. 1710 represents the table in FileA, while 1730 represents the table in FileB. A column value expression for Col1 is shown in 1720, which has an edge pointing to the FileA relation 1710. Similarly, a column value expression Col1 is shown in 1740, which has an edge pointing to FileB 1720. 1750 is a relational predicate expression that equates 1720 and 1740.

Figures 18, 19:
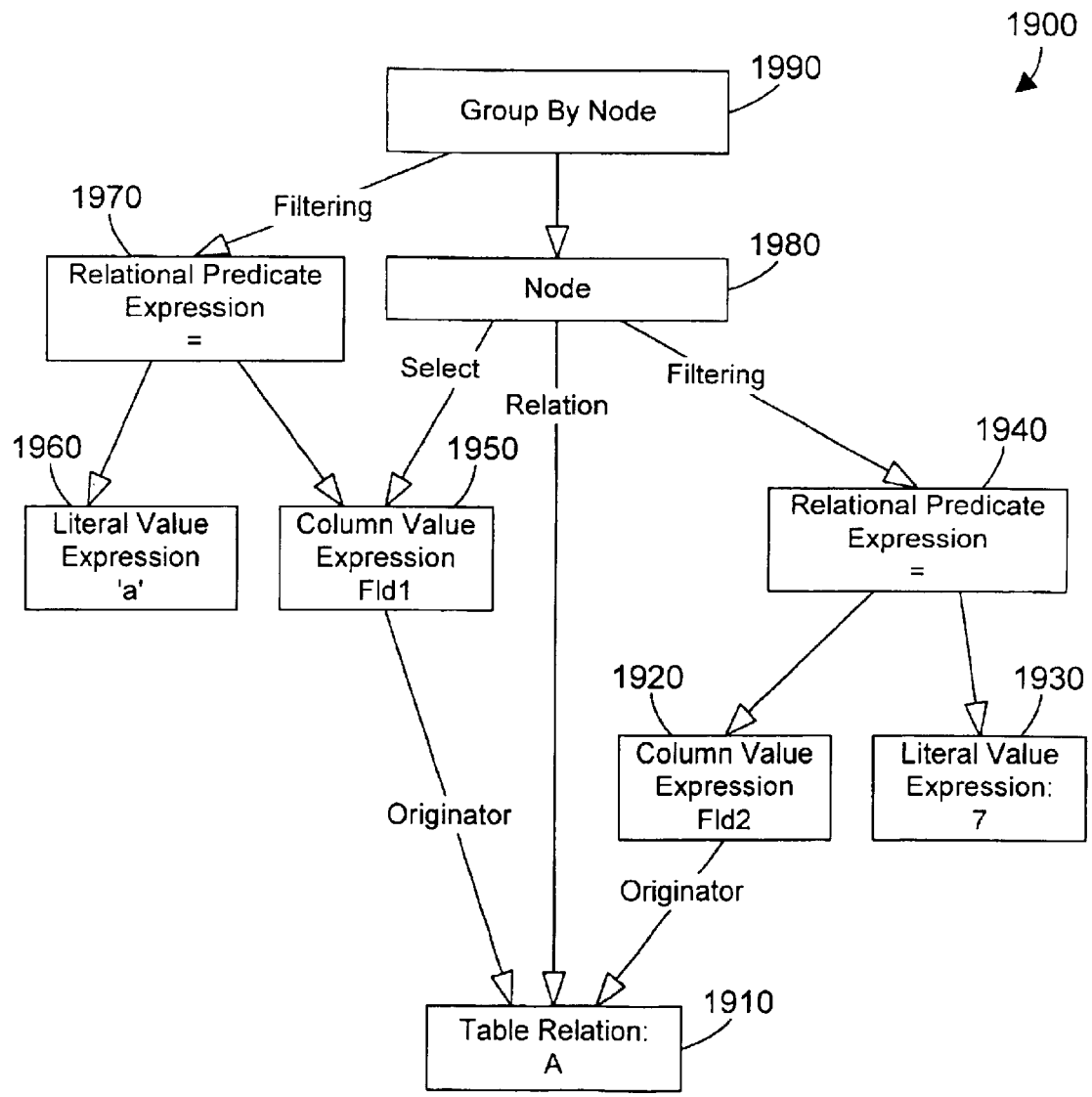
FIG. 18 is a sample query in SQL.
FIG. 19 is a graph of the query of FIG. 18 that is built by the query optimizer in accordance with the preferred embodiments.

A more complex query is now shown in FIG. 18. Its corresponding NRE graph 1900 in accordance with the preferred embodiments is shown in FIG. 19. 1910 corresponds to table relation A. 1920, 1930 and 1940 with their associated edges correspond to "Fld2=7" in the WHERE clause of the query. Note that the WHERE clause performs a filtering function, as shown by the "Filtering" label on the edge that connects node 1980 to expression 1940. 1950, 1960 and 1970 represent "Fld1='a'" from the HAVING clause of the query. Node 1980 represents the "SELECT Fld1 FROM A" clause of the query, while the GROUP BY in the query is represented by the Group By node 1990. FIGS. 18 and 19 show that even complex queries may be accurately represented using an NRE graph of the preferred embodiments.

Figures 20, 21:
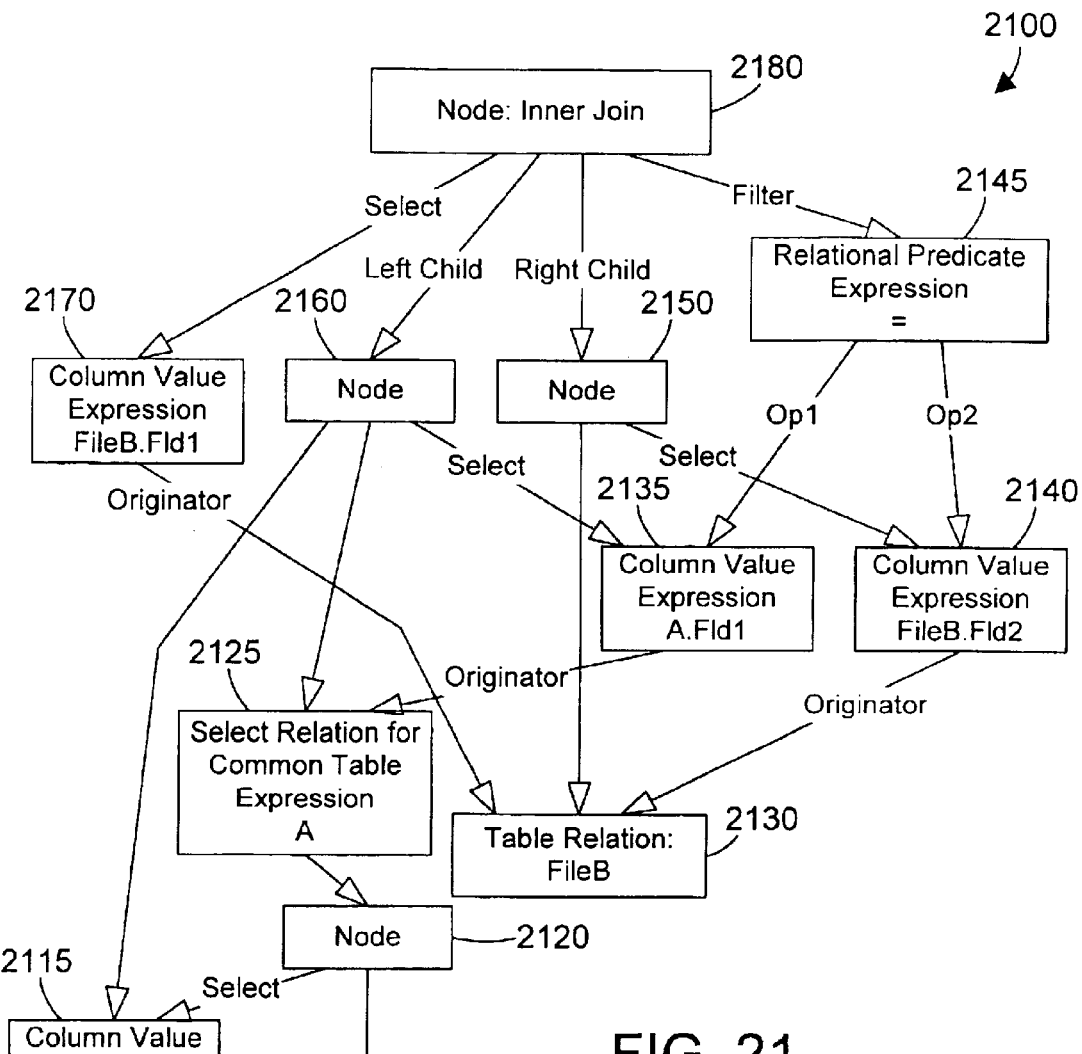
FIG. 20 is a sample query in SQL.
FIG. 21 is a graph of the query of FIG. 20 that is built by the query optimizer in accordance with the preferred embodiments.

Another complex query is shown in FIG. 20. Note that this query includes a SELECT statement as a parameter to the WITH A AS statement, which represents a query within a query. Referring to FIG. 21, 2105, 2110, 2115, and 2120 represent the "SELECT C.Fld1 FROM FileA C" in the first line of the query. 2130, 2135, 2140, and 2145 correspond to the WHERE clause in the query. Expression 2170 represents Fld1, whose value is returned as a result of the query. Joins are represented in the NRE graph as combinations of two tuple sets. Node 2160 represents the left side of this combination, while 2150 represents the right side. 2125 is a vertex that represents the raw tuples input to the left side of the join (node 2160). 2125 is called a SELECT relation. Finally, node 2180 is the node that projects the final answer tuple set to the user (the result of the join).

Figure 22:
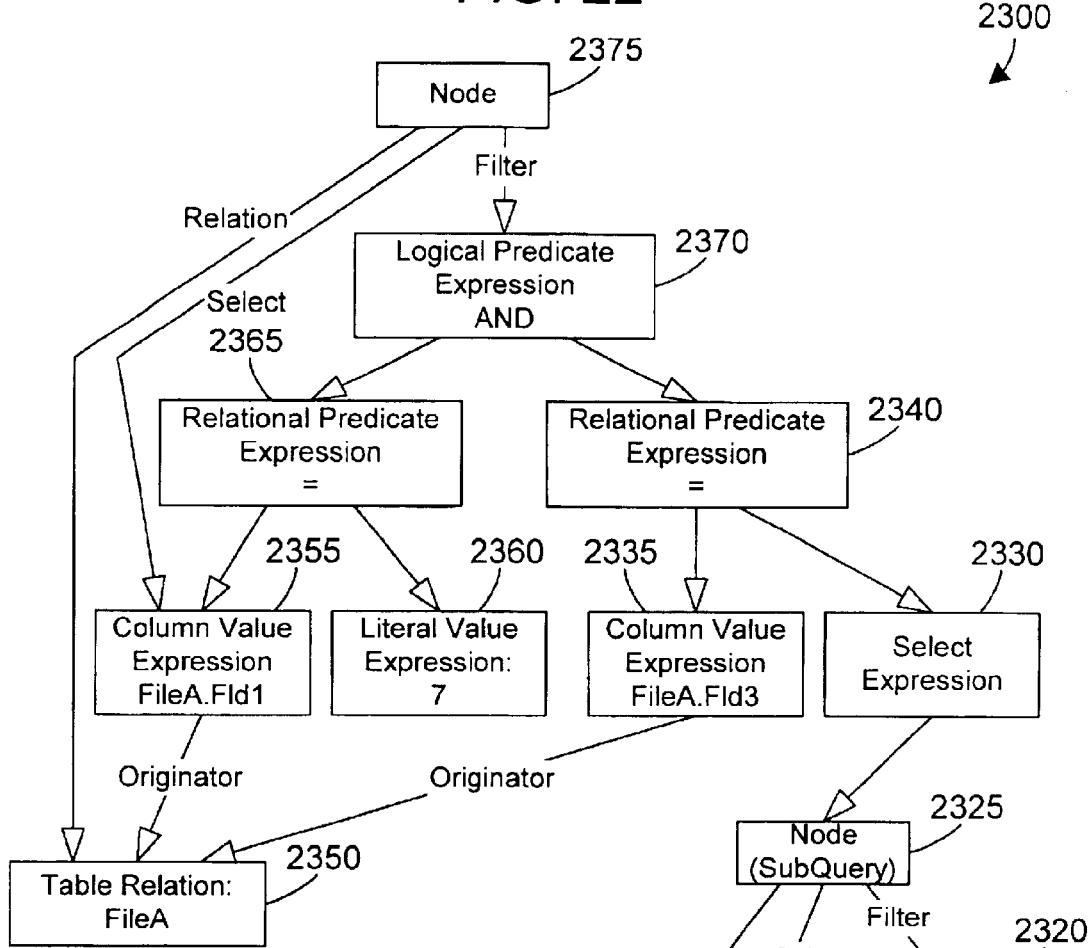
FIG. 22 is a sample query in SQL.
Figure 23:
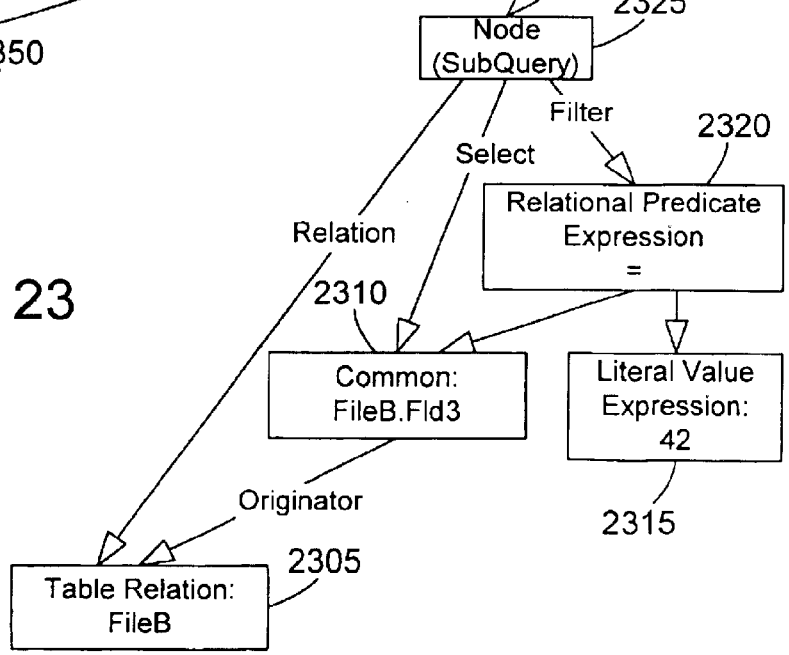
FIG. 23 is a graph of the query of FIG. 22 that is built by the query optimizer in accordance with the preferred embodiments.

Yet another complex query is shown in FIG. 22. Again, this query includes multiple SELECT statements, resulting in a subquery within a query. Vertices 2305, 2310, 2315, 2320, and 2325 represent the subquery, namely "SELECT FileB.Fld3 FROM FileB WHERE Fld3=42" in the last line of the query. Combining these with 2330, 2335 and 2340 yields a sub-portion of the graph that represents the last line of the query in FIG. 22. Vertex 2350 represents the table in FileA. 2350, 2355, 2360 and 2365 represent the "Fld1=7" in the WHERE clause of the query. 2370 represents the logical AND of the Fld1=7 clause and the clause on the last line of the query. Node 2375 is the top node that defines the SELECT Fld1 FROM FileA portion of the query and uses the rest of the graph as a filter due to the WHERE clause in the query.

Figure 24:
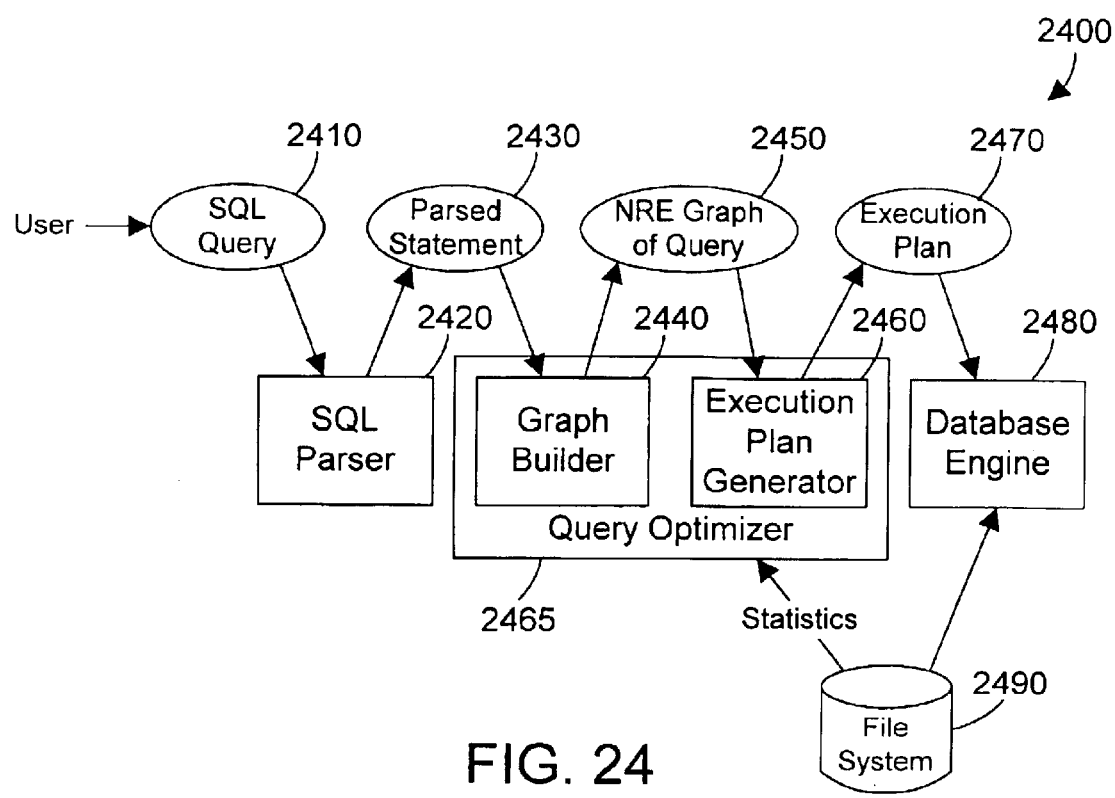
FIG. 24 is a block diagram of a system for processing queries in accordance with the preferred embodiments.

Referring now to FIG. 24, a system 2400 in accordance with the preferred embodiments for processing a query receives a query, such as an SQL query 2410, from a user. An SQL parser 2420 generates from the SQL query 2410 a parsed statement 2430. SQL parsers are known in the art, and parser 2420 is preferably a known SQL parser, but could also be any suitable parser for parsing a query. The parsed statement 2430 is input to a graph builder 2440, which generates from the parsed statement 2430 an NRE graph 2450 of the query. FIGS. 6–23 and the associated discussion in the text show examples of how an SQL query 2410 is converted into an NRE graph 2450. Once the NRE graph 2450 is generated, it is input into the execution plan generator 2460, which generates execution plans for each sub-portion of the NRE graph 2450 and appends the execution plans to the NRE graph 2450. The combination of execution plans for all of the sub-portions of the NRE graph make up the overall execution plan 2470 for the query. Now the database engine 2480 can use the execution plan 2470 to estimate the performance of the query when accessing the file system 2490 by providing statistics from the file system 2490 to the execution plan generator 2460. The execution plan generator 2460 may use these statistics to evaluate alternative execution plans to determine which execution plan will execute the query in the shortest time. Note that the graph builder 2440 and execution plan generator 2460 are preferably part of the query optimizer 2565 in FIG. 24.

Figure 25:
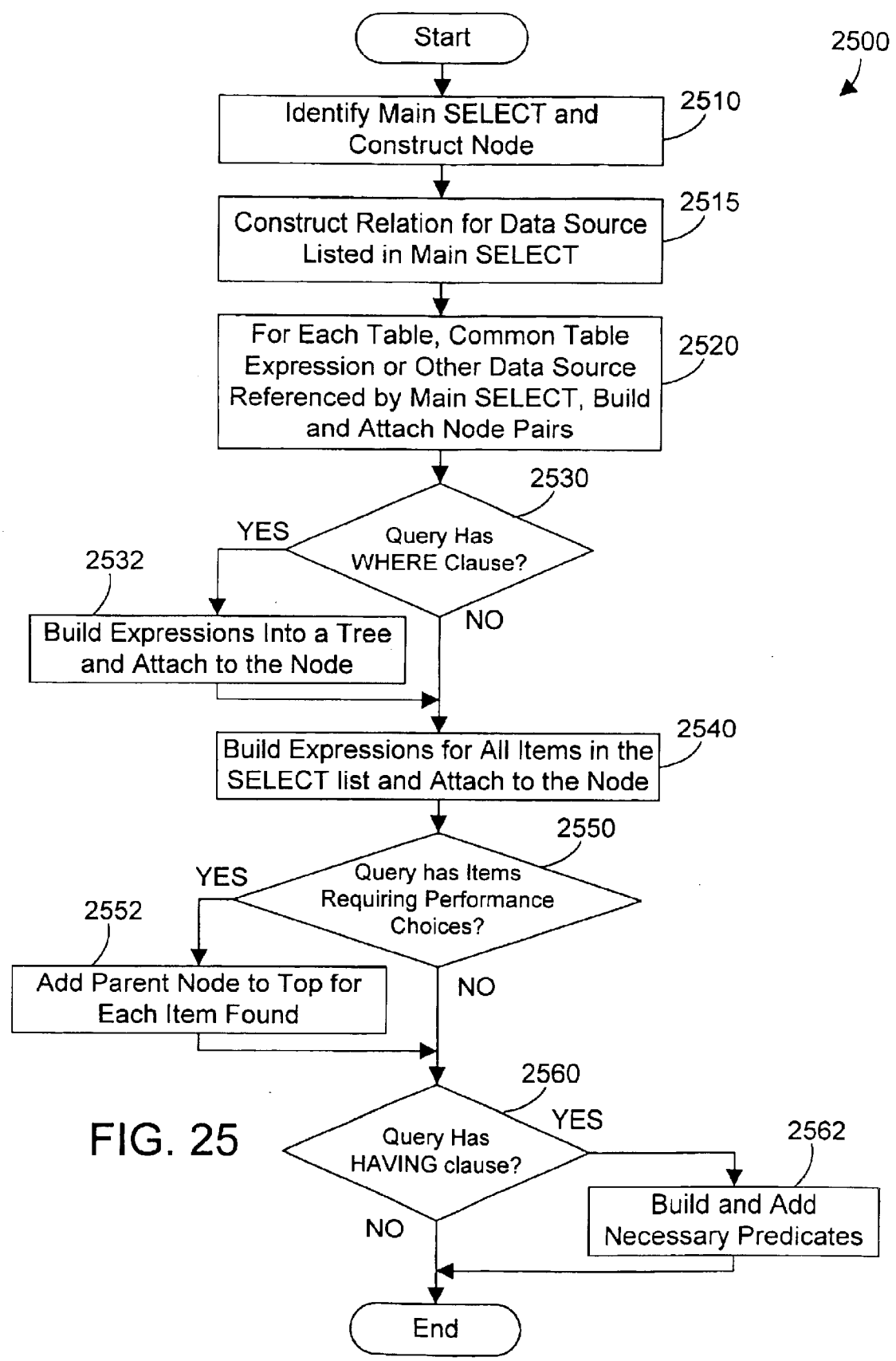
FIG. 25 is a flow diagram of a method for constructing a graph from a query in accordance with the preferred embodiments.

Referring to FIG. 25, a method 2500 for the graph builder 2440 of FIG. 24 to construct an NRE graph of the query begins by identifying a main SELECT statement, and constructing a node corresponding to the main SELECT statement (step 2510). Next, a relation for the data source listed in the main SELECT statement is built and attached to the main select node (step 2515). Then, for each table, common table expression, or other data source referenced by the main SELECT, node pairs are built and attached to the SELECT node (step 2520). If the query has a WHERE clause (step 2530), the expressions in the WHERE clause are built into a tree and attached to the main SELECT node (step 2532). After building the expressions for a WHERE clause (step 2532), or if no WHERE clause is present in the query (step 2530=NO), the expressions for all items in the SELECT list are built and attached to the main SELECT node (step 2540). If the query has one or more items that require performance choices (step 2550=YES), a parent node is added to the top of the NRE graph for each item found (step 2552). Examples of items that require performance choices are GROUP BY and ORDER BY statements. After adding parent nodes in step 2552, or if the query does not have items that require performance choices (step 2550=NO), method 2500 checks to see if there is a HAVING clause in the query (step 2560). If so (step 2560=YES), nodes for the predicate expressions in the HAVING clause are built and added to the NRE graph (step 2562). If not (step 2560=NO), method 2500 is done.

Figure 26:
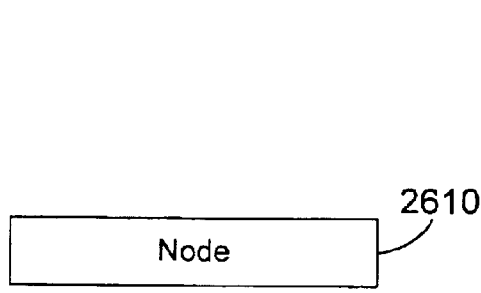
FIGS. 26–31 show the steps of incrementally building the graph of FIG. 19 by performing the steps in FIG. 25 in accordance with the preferred embodiments.
Figure 27:
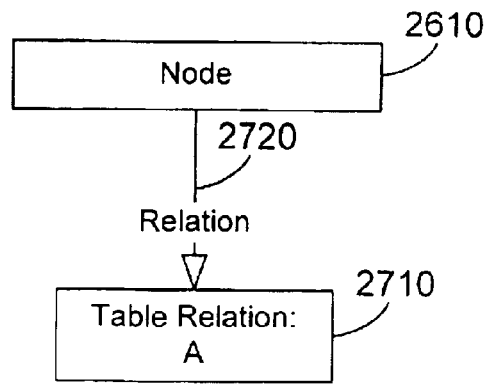
Figure 28:
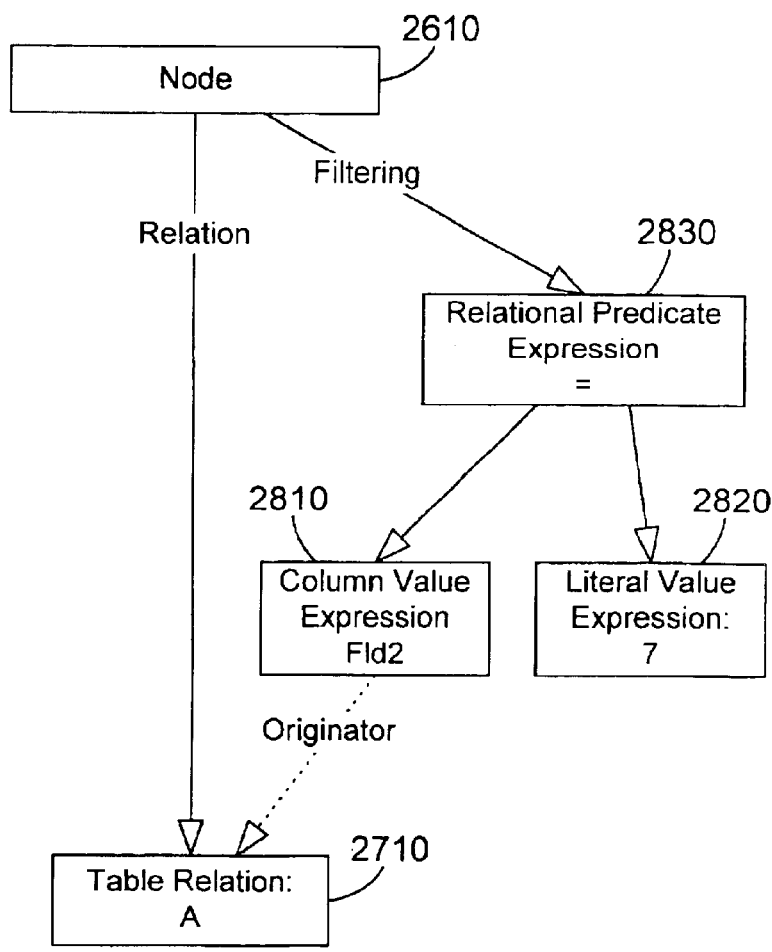
Figure 29:
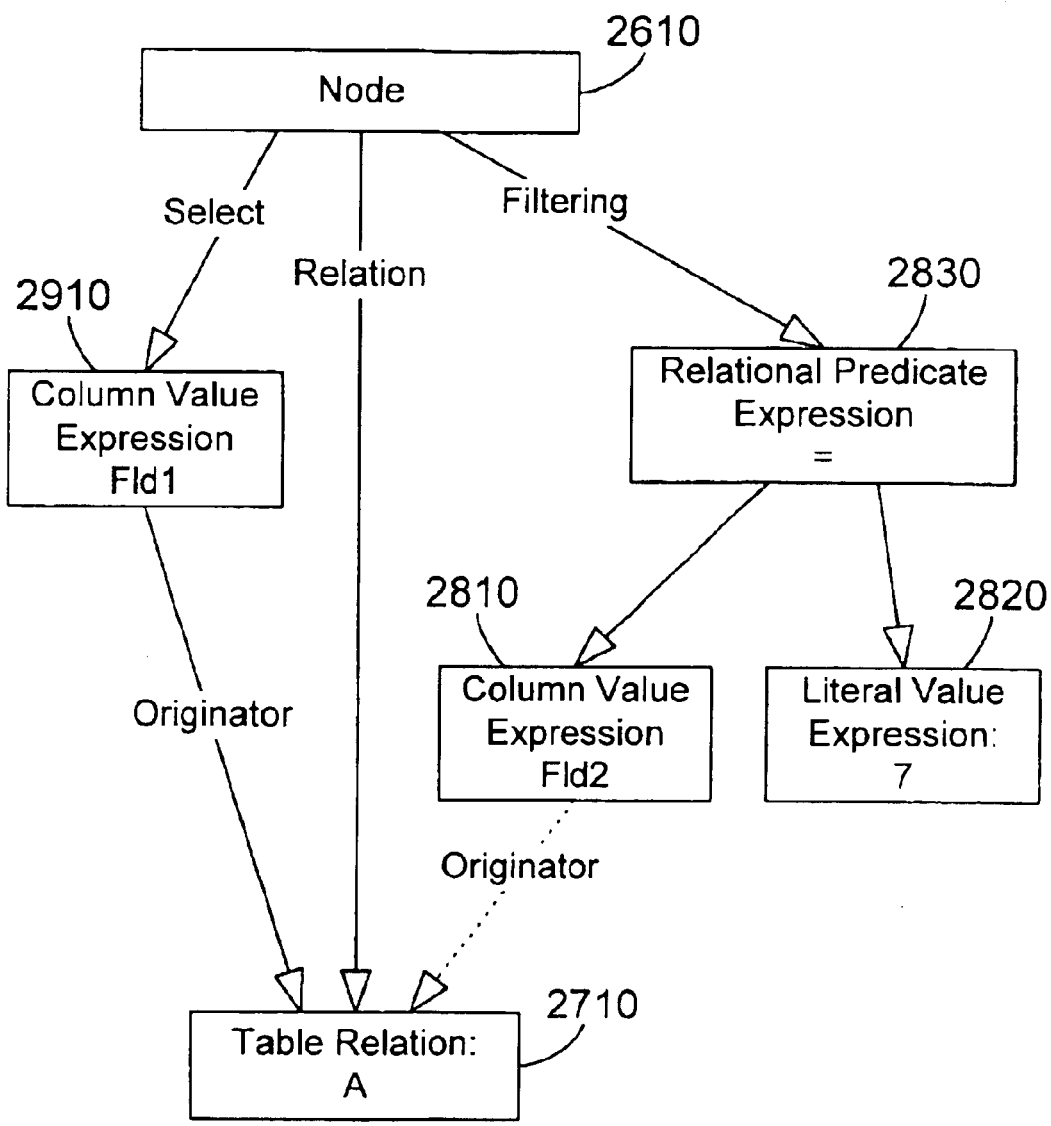

We now apply method 2500 of FIG. 25 to the query in FIG. 18 to determine step-by-step how the NRE graph for the query is constructed. Step 2510 identifies the main SELECT statement, and builds a node 2610 in FIG. 26 corresponding to the main SELECT statement. Step 2515 constructs 2710, and attaches this to the main SELECT node 2610 using a relation edge 2720, as shown in FIG. 27. Next, step 2520 is performed. In this particular case, there is no table, common expression, or other data source referenced by the main SELECT, so nothing is done in step 2520. There is a WHERE clause in the query of FIG. 18, so step 2530=YES, and the expression for the WHERE clause is built and attached to the main node (step 2532). The expression for the WHERE clause is shown in FIG. 28 as 2810, 2820 and 2830. Next, the SELECT list is read, which contains the Fld1 operand, so 2910 for the Fld1 operand is built and attached to the main SELECT node 2610 (step 2540), as shown in FIG. 29.

Figure 30:
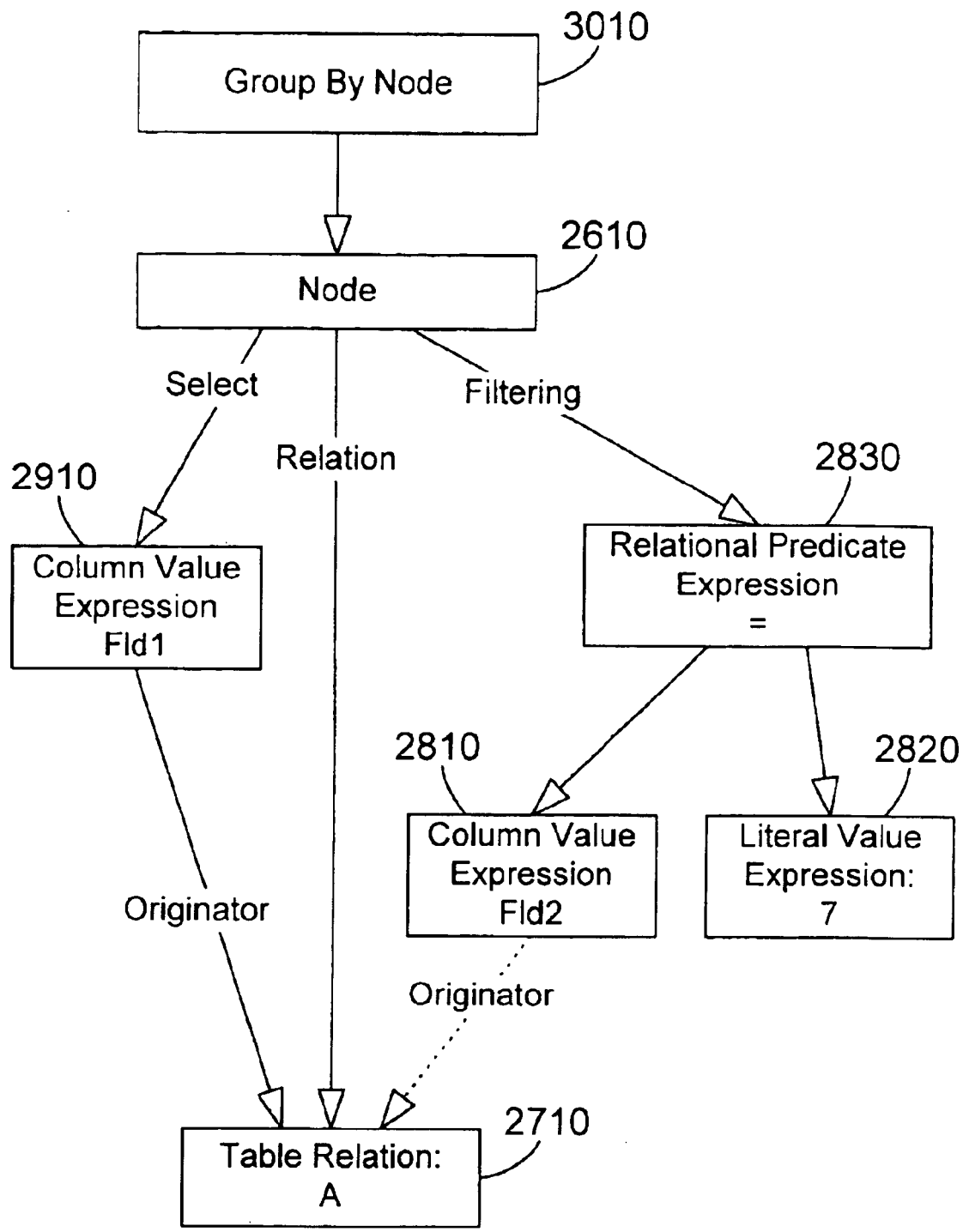
Figure 31:
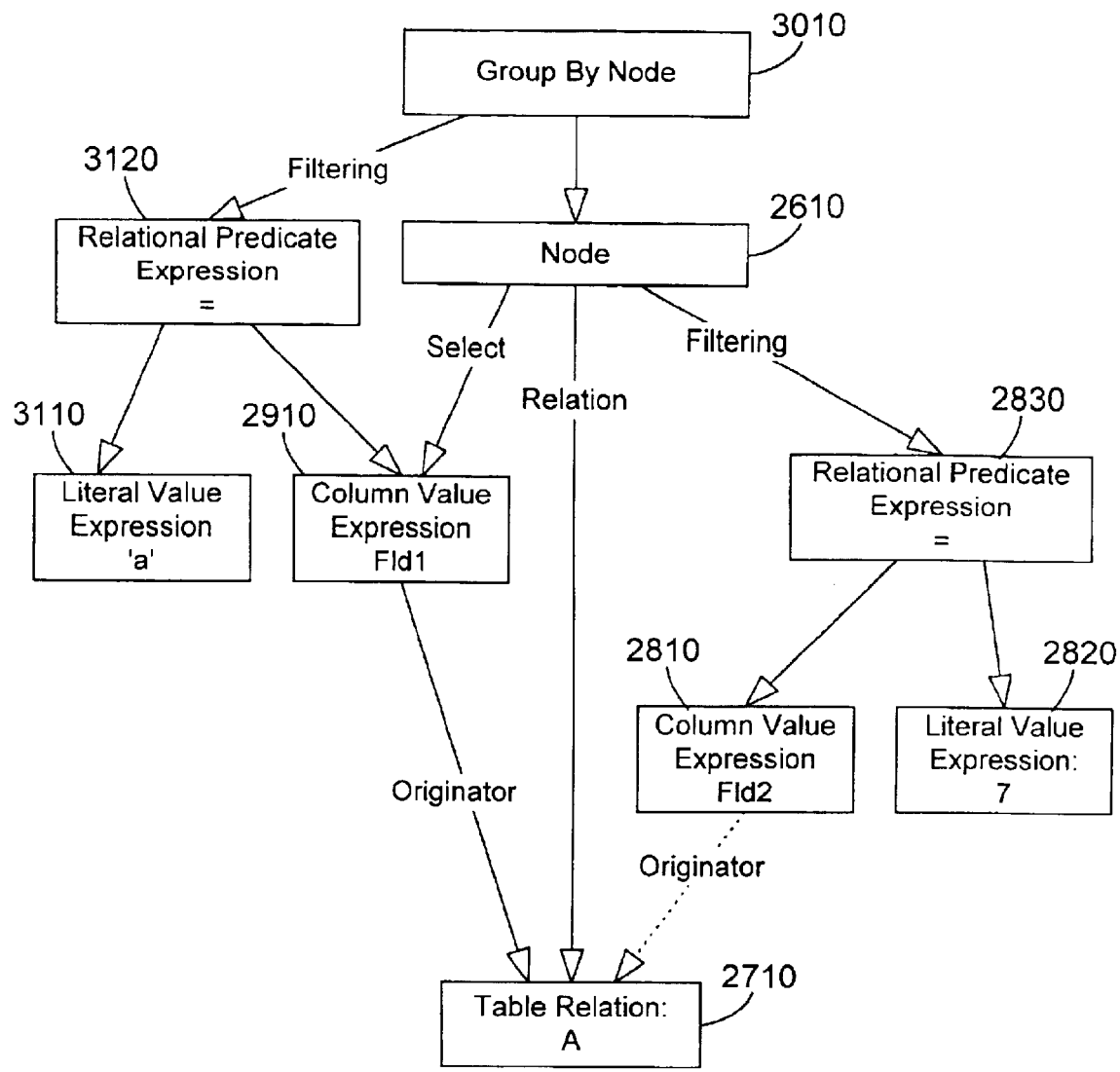

There is a GROUP BY clause in the query, which is an item that requires performance choices (step 2550=YES), so a parent node 3010 is added to the top of the NRE graph as shown in FIG. 30. The query includes a HAVING clause (step 2560=YES), so a tree corresponding to the predicate expression of the HAVING clause is added to the NRE graph. This tree consists of 3110 and 3120 in FIG. 31, along with 2910 that was already present in the NRE graph. The result is the NRE graph of FIG. 31, which is identical to the graph of FIG. 19, with the exception of different reference designators.

Figure 32:
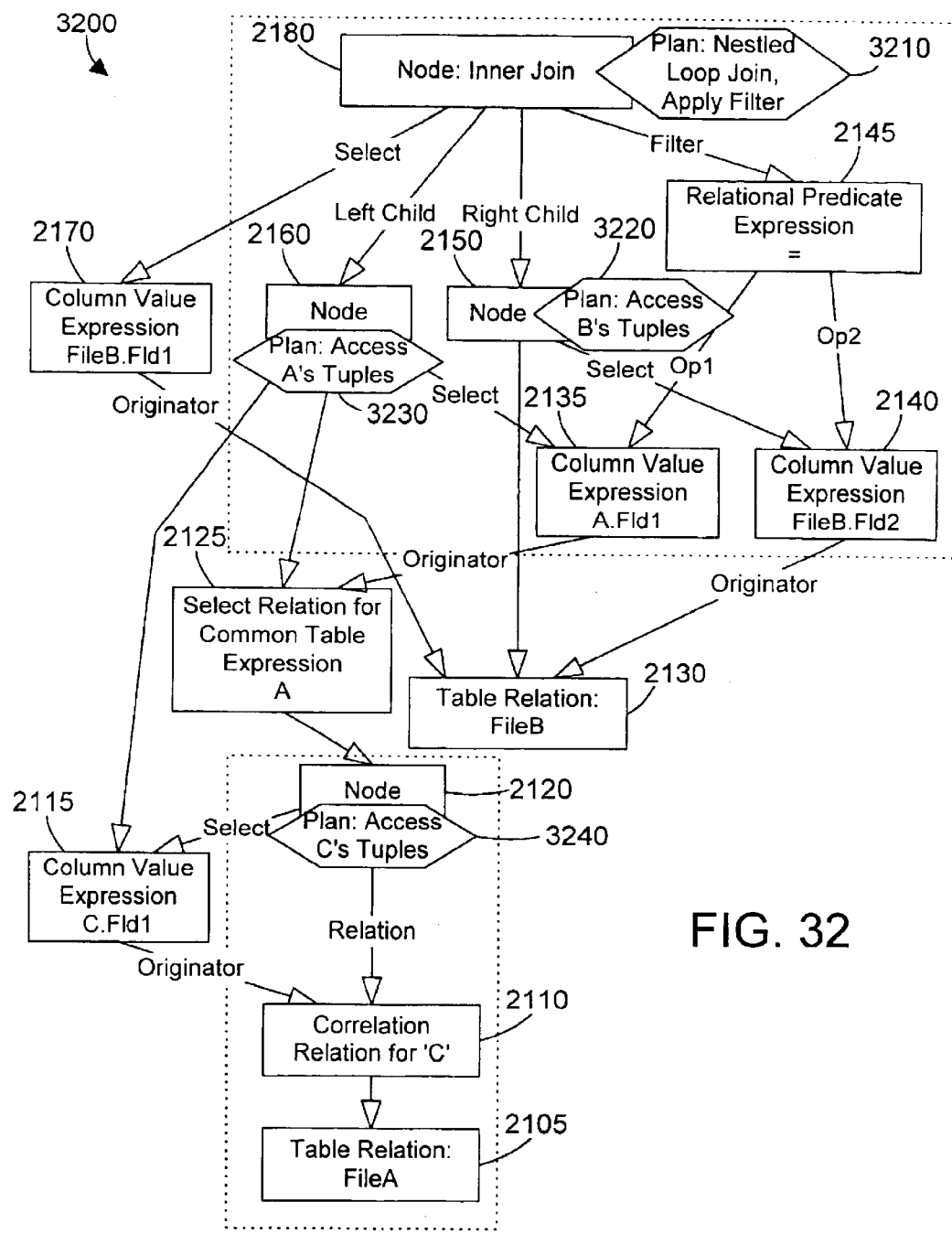
FIG. 32 is a graph of the query in FIG. 20 with execution plans appended to nodes in the graph.

The graph builder of the preferred embodiments puts all nodes, relations, and edges for a query in a single graph. A significant advantage of the present invention is how the execution plan is generated and appended as part of the NRE graph. FIG. 32 shows the NRE graph of FIG. 21 with the addition of execution plan information. Note that the execution plan information is preferably added by the execution plan generator 2460 of FIG. 24. FIG. 32 shows four execution plans added to the NRE graph of FIG. 21, namely 3210, 3220, 3230 and 3240. Execution plan 3240 is the execution plan for node 2120. This plan specifies that C's tuples will be accessed. Execution plan 3230 is the execution plan for node 2160. This plan specifies that A's tuples will be accessed. Execution plan 3220 is the execution plan for node 2150. This plan specifies that B's tuples will be accessed. Execution plan 3210 is the execution plan for node 2180. This plan specifies that a nestled loop join is performed, followed by the filter represented by the WHERE clause. Note that the aggregate of these four execution plans make up the overall execution plan for the query, represented in FIG. 24 as execution plan 2470. Appending the execution plan information into the NRE graph allows those portions of the graph that do not change to retain their same execution plan. Thus, the execution plan 3210 for node 2180 may be changed without affecting the execution plans 3220, 3230, and 3240 below it. This is in sharp contrast to the prior art, which generates a single execution plan for the entire query, as shown in FIGS. 33 and 34.

Figure 33:
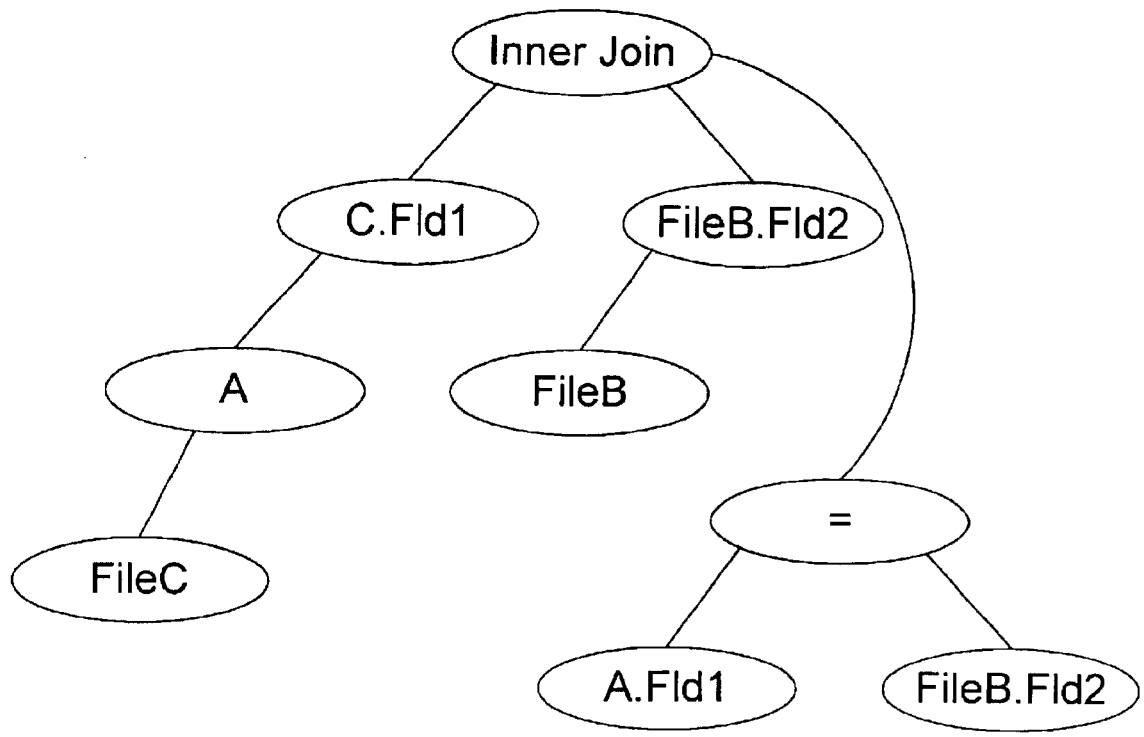
FIG. 33 is a prior art graph of the query of FIG. 20.
Figure 34:
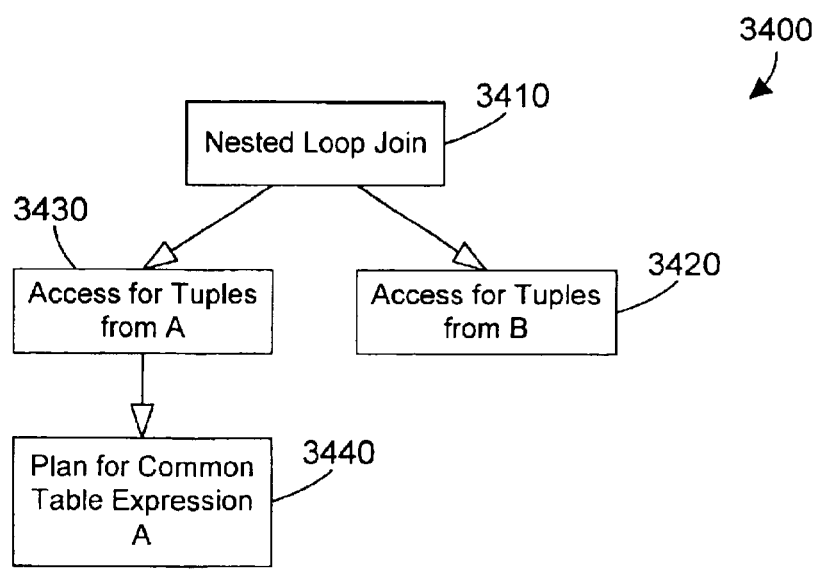
FIG. 34 is a prior art execution plan for the query of FIG. 20 represented in the graph of FIG. 33.

For the query of FIG. 20, a prior art query optimizer might build a graph like that shown in FIG. 33. A corresponding execution plan 3400 according to the prior art is shown in FIG. 34. Note that the execution plan 3400 includes a tree of information that includes vertices 3410, 3420, 3430 and 3440. Whenever any portion of the execution plan 3400 is changed, the entire execution plan 3400 must be regenerated. The preferred embodiments, in contrast, break the execution plan up into component parts that are appended to the NRE graph. This allows a change to an execution plan in one portion of the graph without necessarily affecting the execution plans in other portions of the graph. As a result, alternative execution plans may be generated and evaluated much more quickly than the prior art, because a new execution plan for the query may be generated that includes previously-generated execution plans, thereby increasing the speed of generating and evaluating alternative execution plans, which speeds up the processing of the database query by the query optimizer.

Figure 35:
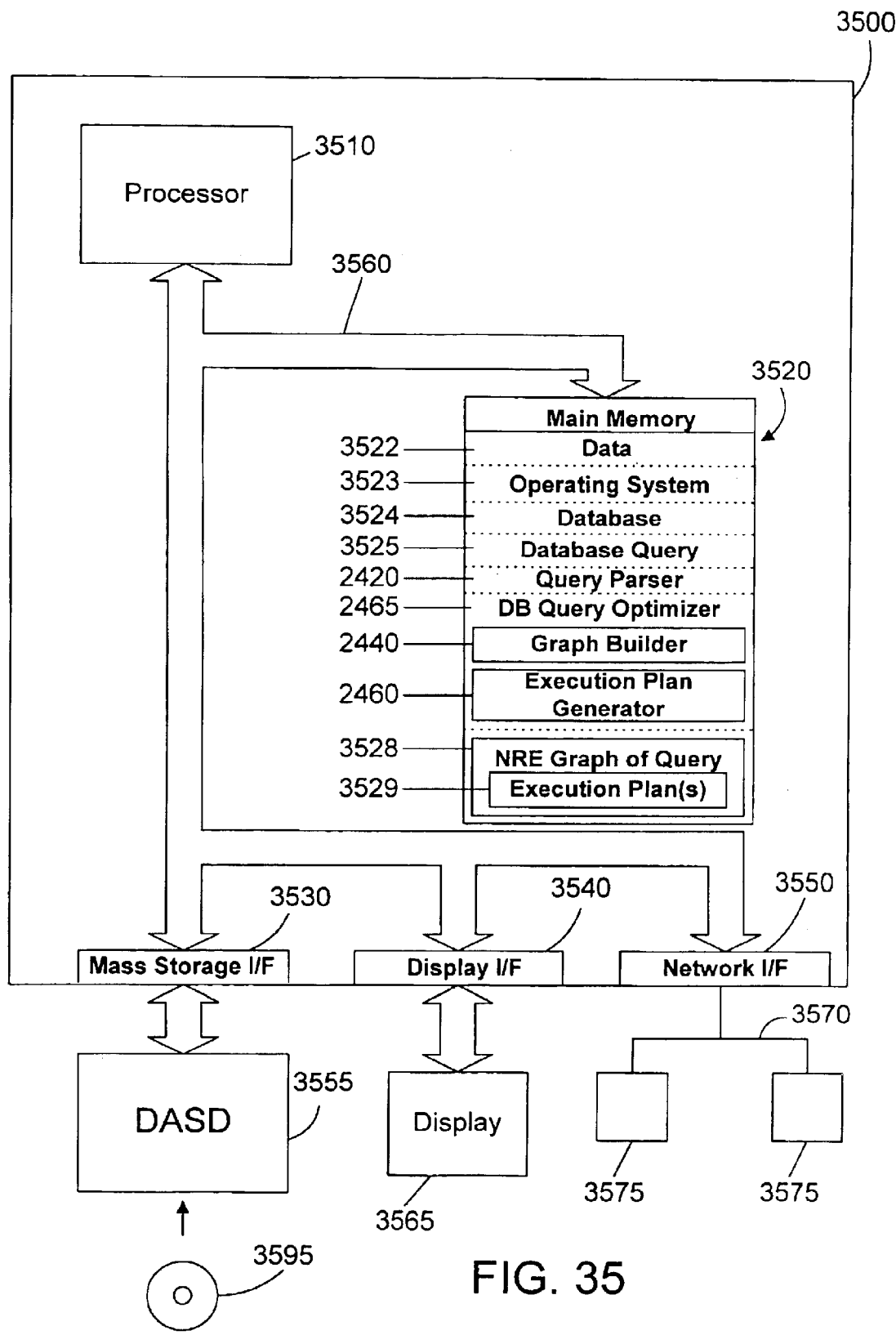
FIG. 35 is an apparatus in accordance with the preferred embodiments.

Referring now to FIG. 35, a computer system 3500 is one suitable implementation of an apparatus in accordance with the preferred embodiments of the invention. Computer system 3500 is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG.35, computer system 3500 comprises a processor 3510, a main memory 3520, a mass storage interface 3530, a display interface 3540, and a network interface 3550. These system components are interconnected through the use of a system bus 3560. Mass storage interface 3530 is used to connect mass storage devices (such as a direct access storage device 3555) to computer system 3500. One specific type of direct access storage device 3555 is a readable and writable CD ROM drive, which may store data to and read data from a CD ROM 3595.

Main memory 3520 in accordance with the preferred embodiments contains data 3522, an operating system 3523, a database 3524, one or more database queries 3525, a query parser 2420, a database query optimizer 2465, and one or more NRE graphs 3528. Database query optimizer 2465 includes a graph builder 2440 and an execution plan generator 2460. Note that the query parser 2420, the graph builder 2440 and the execution plan generator 2460 are shown in FIG. 24 and are described in detail above in the specification. NRE graph 3528 suitably includes multiple execution plans 3529 which, when taken together, define an overall execution plan for the query. By providing separate execution plans 3529 that are appended to nodes in the NRE graph 3528, the execution plan for one portion of the graph may be changed without necessarily affecting the execution plans for other portions of the graph. One example of NRE graph 3528 is the graph 3200 shown in FIG. 32, which is discussed in detail above.

Computer system 3500 utilizes well known virtual addressing mechanisms that allow the programs of computer system 3500 to behave as if they only have access to a large, single storage entity instead of access to multiple, smaller storage entities such as main memory 3520 and DASD device 3555. Therefore, while data 3522, operating system 3523, database 3524, database query 3525, query parser 2420, database query optimizer 2465, and NRE graphs 3528 are shown to reside in main memory 3520, those skilled in the art will recognize that these items are not necessarily all completely contained in main memory 3520 at the same time. It should also be noted that the term "memory" is used herein to generically refer to the entire virtual memory of computer system 3500, and may include the virtual memory of other computer systems coupled to computer system 3500.

Data 3522 represents any data that serves as input to or output from any program in computer system 3500. Operating system 3523 is a multitasking operating system known in the industry as OS/400; however, those skilled in the art will appreciate that the spirit and scope of the present invention is not limited to any one operating system. Database 3524 is any suitable database, whether currently known or developed in the future. Database query 3525 is a query in a format compatible with the database 3524 that allows information stored in the database 3524 that satisfies the database query 3525 to be retrieved. Query parser 2420 is any suitable parser that can parser the query into separate pieces for processing. Database query optimizer 2465 processes database query 3525, and generates therefrom a corresponding NRE graph 3528 that contains multiple execution plans 3529 that, taken together, define the execution plan for the overall query.

Processor 3510 may be constructed from one or more microprocessors and/or integrated circuits. Processor 3510 executes program instructions stored in main memory 3520. Main memory 3520 stores programs and data that processor 3510 may access. When computer system 3500 starts up, processor 3510 initially executes the program instructions that make up operating system 3523. Operating system 3523 is a sophisticated program that manages the resources of computer system 3500. Some of these resources are processor 3510, main memory 3520, mass storage interface 3530, display interface 3540, network interface 3550, and system bus 3560.

Although computer system 3500 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 3510. However, those skilled in the art will appreciate that the present invention applies equally to computer systems that simply use I/O adapters to perform similar functions.

Display interface 3540 is used to directly connect one or more displays 3565 to computer system 3500. These displays 3565, which may be non-intelligent (i.e., dumb) terminals or fully programmable workstations, are used to allow system administrators and users to communicate with computer system 3500. Note, however, that while display interface 3540 is provided to support communication with one or more displays 3565, computer system 3500 does not necessarily require a display 3565, because all needed interaction with users and other processes may occur via network interface 3550.

Network interface 3550 is used to connect other computer systems and/or workstations (e.g., 3575 in FIG. 35) to computer system 3500 across a network 3570. The present invention applies equally no matter how computer system 3500 may be connected to other computer systems and/or workstations, regardless of whether the network connection 3570 is made using present-day analog and/or digital techniques or via some networking mechanism of the future. In addition, many different network protocols can be used to implement a network. These protocols are specialized computer programs that allow computers to communicate across network 3570. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROM (e.g., 3595 of FIG. 35), and transmission type media such as digital and analog communications links.

The preferred embodiments described herein process a database query, generate an NRE graph of the query, and generate execution plan information that is appended to nodes in the NRE graph. The overall execution plan for the query is made up of multiple execution plans for sub-portions of the NRE graph. As a result, the execution plan for one portion of the NRE graph can be changed without necessarily affecting the execution plan for other portions of the graph. This allows alternative execution plans to be quickly generated and evaluated to determine the best execution plan for a query in less time than is possible using prior art methods.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:

at least one processor;

a memory coupled to the at least one processor; and an optimizer residing in the memory and executed by the at least one processor, the optimizer analyzing an expression and generating from the expression a graph that includes at least one node, the optimizer generating from the graph an execution plan for the expression, the execution plan comprising a plurality of execution plans that correspond to different portions of the graph.

2. The apparatus of claim 1 wherein the plurality of execution plans are appended to corresponding nodes in the graph.

3. The apparatus of claim 1 wherein the optimizer generates a new execution plan for the query by changing at least one of the plurality of execution plans, and by using an existing execution plan for each portion of the graph that is unaffected by the change.

4. The apparatus of claim 1 wherein the graph further comprises a plurality of relations and a plurality of expressions.

5. An apparatus comprising:

at least one processor;

a memory coupled to the at least one processor;

a database residing in the memory;

a database query optimizer residing in the memory and executed by the at least one processor, the database query optimizer processing a query to the database, the database query optimizer comprising:

a graph builder that generates from the query a graph that includes at least one node; and an execution plan generator that generates from the graph an execution plan for the query, the execution plan comprising a plurality of execution plans that correspond to different portions of the graph.

6. The apparatus of claim 5 wherein the execution plan generator appends the plurality of execution plans to corresponding nodes in the graph.

7. The apparatus of claim 5 wherein the execution plan generator generates a new execution plan for the query by changing at least one of the plurality of execution plans, and by using an existing execution plan for each portion of the graph that is unaffected by the change.

8. The apparatus of claim 5 wherein the graph further comprises a plurality of relations and a plurality of expressions in the query.

9. The apparatus of claim 5 wherein the optimizer compares a plurality of execution plans that each functionally represent the query to estimate which of the plurality of execution plans will be executed in the least amount of time.

10. A method for evaluating an expression comprising the steps of:

reading the expression;

generating from the expression a graph that includes at least one node;

generating from the graph an execution plan for the expression, the execution plan comprising a plurality of execution plans that correspond to different portions of the graph.

11. The method of claim 10 further comprising the step of appending the plurality of execution plans to corresponding nodes in the graph.

12. The method of claim 10 further comprising the step of generating a new execution plan for the query by performing the steps of:

changing at least one of the plurality of execution plans; and using an existing execution plan for each portion of the graph that is unaffected by the change.

13. The method of claim 10 further comprising the step of comparing a plurality of execution plans that each functionally represent the query to determine which of the plurality of execution plans will likely be executed in the least amount of time.

14. A program product comprising:

(A) an optimizer that analyzes an expression and generates from the expression a graph that includes at least one node, the optimizer generating from the graph an execution plan for the expression, the execution plan comprising a plurality of execution plans that correspond to different portions of the graph; and (B) computer-readable signal bearing media bearing the optimizer.

15. The program product of claim 14 wherein the computer-readable signal bearing media comprises recordable media.

16. The program product of claim 14 wherein the computer-readable signal bearing media comprises transmission media.

17. The program product of claim 14 wherein the optimizer appends the plurality of execution plans to corresponding nodes in the graph.

18. The program product of claim 14 wherein the optimizer generates a new execution plan for the query by changing at least one of the plurality of execution plans, and by using an existing execution plan for each portion of the graph that is unaffected by the change.

19. The program product of claim 14 wherein the graph further comprises a plurality of relations and a plurality of expressions.

20. The program product of claim 14 wherein the optimizer compares a plurality of execution plans that each functionally represent the expression to estimate which of the plurality of execution plans will be executed in the least amount of time.

* * * * *